(12) United States Patent
Rizzo et al.

(10) Patent No.: US 12,309,520 B2
(45) Date of Patent: May 20, 2025

(54) ENABLING AUTOMATIC GENERATION OF DAILIES

(71) Applicants: Sony Group Corporation, Tokyo (JP); Sony Pictures Entertainment Inc., Culver City, CA (US)

(72) Inventors: Joshua Rizzo, Stevenson Ranch, CA (US); Phillip Squyres, Culver City, CA (US)

(73) Assignees: SONY GROUP CORPORATION, Tokyo (JP); SONY PICTURES ENTERTAINMENT INC., Culver City, CA (US)

( * ) Notice: Subject to any disclaimer, the term of this patent is extended or adjusted under 35 U.S.C. 154(b) by 47 days.

(21) Appl. No.: 18/210,322

(22) Filed: Jun. 15, 2023

(65) Prior Publication Data
US 2024/0205355 A1    Jun. 20, 2024

Related U.S. Application Data

(60) Provisional application No. 63/476,039, filed on Dec. 19, 2022.

(51) Int. Cl.
*H04N 5/06* (2006.01)
*G06V 30/14* (2022.01)

(52) U.S. Cl.
CPC ............ *H04N 5/06* (2013.01); *G06V 30/1448* (2022.01)

(58) Field of Classification Search
CPC ........ H04N 5/04; H04N 5/06; H04N 21/8547; H04N 21/242; H04N 21/4302; G11B 27/10; G06V 30/1448

USPC ......................................... 348/500, 512, 515
See application file for complete search history.

(56) References Cited

U.S. PATENT DOCUMENTS

| | | | |
|---|---|---|---|
| 8,483,540 B2 | 7/2013 | Doser et al. | |
| 8,819,014 B2 | 8/2014 | Roenning et al. | |
| 9,612,519 B2 | 4/2017 | Kehlet et al. | |
| 2004/0183825 A1 | 9/2004 | Stauder et al. | |
| 2009/0231492 A1* | 9/2009 | Wayne ................ | G11B 27/322 348/E5.022 |
| 2010/0042650 A1* | 2/2010 | Roenning ............ | H04N 9/8244 386/242 |
| 2010/0054696 A1 | 3/2010 | Doser et al. | |
| 2011/0085025 A1* | 4/2011 | Pace .................... | H04N 13/189 348/E5.031 |

OTHER PUBLICATIONS

International Search Report and Written Opinion received in International Application No. PCT/IB2023/061615, dated Feb. 22, 2024, 11 pages.

\* cited by examiner

*Primary Examiner* — Sherrie Hsia
(74) *Attorney, Agent, or Firm* — Procopio, Cory, Hargreaves & Savitch LLP

(57) ABSTRACT

Synchronizing audio and video streams to enable automatic generation of dailies, including: identifying a first time in the audio stream when a sound occurs from closing clapper sticks; identifying a second time in the video stream when there is an image of the clapper sticks closed, wherein the clapper sticks include symbols or patterns applied on a surface of the clapper sticks which appear complete when the clapper sticks are closed; and synchronizing the audio and video streams using the first and the second time.

17 Claims, 4 Drawing Sheets

ENABLING AUTOMATIC GENERATION OF DAILIES

CROSS-REFERENCE TO RELATED APPLICATIONS

This application claims the benefit of priority under 35 U.S.C. § 119 (e) of U.S. Provisional Patent Application No. 63/476,039, filed Dec. 19, 2022, entitled "Auto-Dailies". The disclosure of the above-referenced application is incorporated herein by reference.

BACKGROUND

Field

The present disclosure relates to enabling automatic generation of dailies, and more specifically, to synchronizing audio and video streams to enable automatic generation of dailies.

Background

In filmmaking, dailies are the raw, unedited footage shot during a set period of time and serve as an indication of how the filming and the actors' performances are progressing. In generating the dailies, the sound needs to be synchronized to the video using a clapperboard or clapper as a reference. Thus, the clapperboard is used to create a visual and audio mark while recording audio and video. The clapperboard has two sticks that are attached by a hinge at one end and can make an audible clap sound when the sticks are brought together. The clapperboard is also labeled to identify the scene, shot, and take number for the camera.

During the synchronization process, the dailies operator may look at the timecode numbers on the clapperboard and match the timecode numbers with the clapping sound. That is, the clap sound may be used to identify an audio time code when the sticks are closed. Furthermore, the dailies operator may search for the frame where the clapper first closes and for the clapping sound, adjusting one or the other until they happen simultaneously when played back. This needs to be done for every take. This manual inspection may be time consuming and inconsistent.

SUMMARY

The present disclosure implements techniques for synchronizing audio and video streams to enable automatic generation of dailies.

In one implementation, a method for synchronizing audio and video streams to enable automatic generation of dailies is disclosed. The method includes: identifying a first time in the audio stream when a sound occurs from closing clapper sticks; identifying a second time in the video stream when there is an image of the clapper sticks closed, wherein the clapper sticks include symbols or patterns applied on a surface of the clapper sticks which appear complete when the clapper sticks are closed; and synchronizing the audio and video streams using the first and the second time.

In another implementation, a system for synchronizing audio and video streams to enable automatic generation of dailies is disclosed. The system includes: an audio processor to receive and process the audio stream to identify a first time in the audio stream when a sound occurs from bringing clapper sticks together; a video processor to receive and process the video stream to identify a second time in the video stream when there is an image of the clapper sticks brought together, wherein the clapper sticks include symbols or patterns applied on a surface of the clapper sticks which appear complete when the clapper sticks are brought together; and a synchronization processor to synchronize the audio and video streams using the first and the second time.

In yet another implementation, a non-transitory computer-readable storage medium storing a computer program to synchronize audio and video streams to enable automatic generation of dailies includes executable instructions that cause a computer to: identify a first time in the audio stream when a sound occurs from closing clapper sticks; identify a second time in the video stream when there is an image of the clapper sticks closed, wherein the clapper sticks include symbols or patterns applied on a surface of the clapper sticks which appear complete when the clapper sticks are closed; and synchronize the audio and video streams using the first and the second time.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

Figure 1:
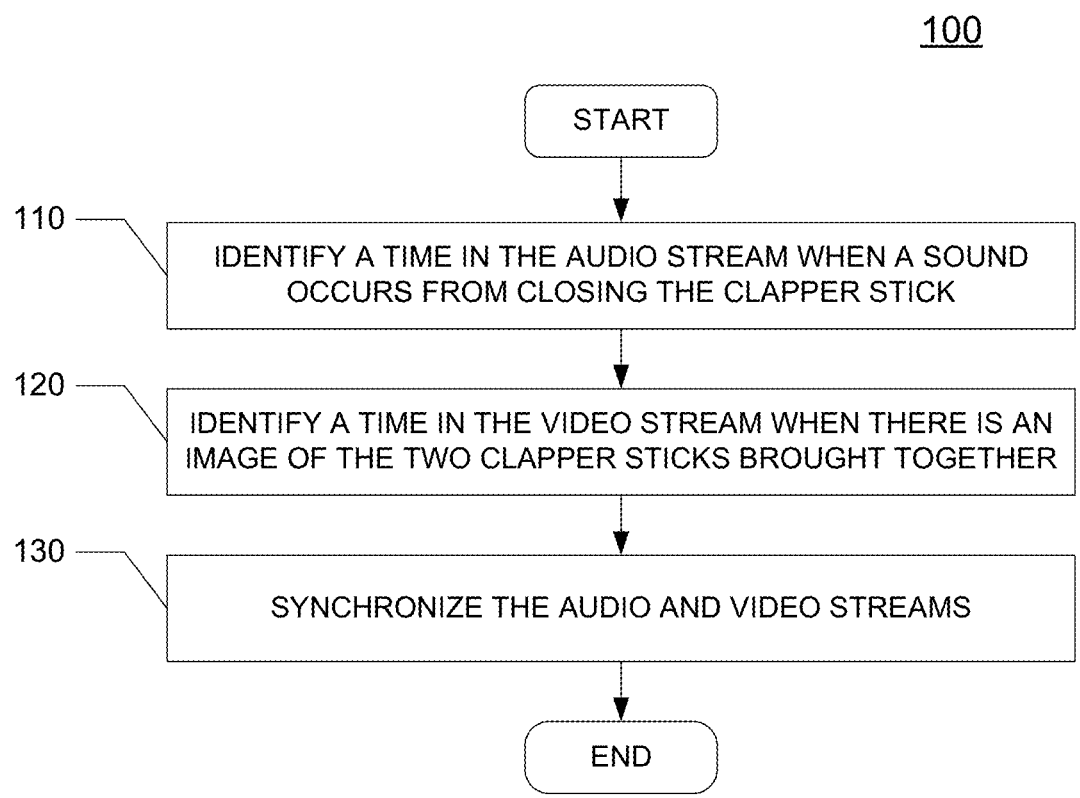
FIG. 1 is a flow diagram of a process for synchronizing audio and video content to enable automatic generation of dailies in accordance with one implementation of the present disclosure.

As described above, the manual inspection of the video to find an image of the sticks closing can be time consuming and inconsistent. To address the issues with the conventional way to select a frame when the sticks are closed and to identify a time code for the selected frame, implementations of the present disclosure provides a technique for synchronizing audio and video content using a combination of pattern recognition and difference detection to synchronize the video and audio. These implementations enable automatic generation of dailies.

After reading the below descriptions, it will become apparent how to implement the disclosure in various implementations and applications. Although various implementations of the present disclosure will be described herein, it is understood that these implementations are presented by way of example only, and not limitation. As such, the detailed description of various implementations should not be construed to limit the scope or breadth of the present disclosure.

In one implementation, a technique for synchronizing audio and video content to enable automatic generation of dailies is disclosed. The technique includes a computer system using a combination of pattern recognition and difference detection to synchronize the video and audio. For television or movie production, a clapperboard is used to create a visual and audio mark while recording audio and video. The clapper has two clapper sticks that are attached by a hinge at one end. The two clapper sticks may make an audible clap sound when the sticks are brought together.

In one implementation, symbols (e.g., letters and numbers) are added to the clapper sticks, wherein each symbol is divided into two parts so that one part of each symbol is on each stick. The symbols are aligned on the sticks so that the symbols appear complete when the two sticks are brought together. The recorded audio and video streams capture the audio and video when the two sticks are brought together. The audio stream includes the clap sound of the sticks being brought together. The video stream includes images before, when, and after the sticks are brought together.

In one implementation, a computer system processes the audio stream to identify an audio clap time when the clap sound occurs. The computer system also processes the video stream to identify a video clap time when the symbols on the sticks are complete. The computer system uses the audio clap time and the video clap time to synchronize the audio stream and the video stream. This automated detection of both audio and video times can enhance the automated synchronization of audio and video streams which can in turn improve the speed and quality of generating dailies in production.

Features provided in implementations can include, but are not limited to, one or more of the following items: (a) Determine the time and frame in a video sequence when the two clapper sticks of a clapperboard are closed based on symbols or patterns on the sticks; (b) use the determined time and frame in the video sequence to synchronize the video sequence with an audio sequence; (c) use the synchronized video and audio sequences to produce video for review of dailies in content production.

FIG. 1 is a flow diagram of a process 100 for synchronizing audio and video content to enable automatic generation of dailies in accordance with one implementation of the present disclosure. In one implementation, the process 100 runs on a computer system which processes recorded audio and video streams of content data and synchronizes the audio and video.

In one implementation, a time in the audio stream when a sound occurs from closing the clapper sticks (i.e., audio processing) is identified, at block 110. A time in the video stream when there is an image of the two clapper sticks brought together (i.e., video processing) is identified, at block 120. In one implementation, the image of the two clapper sticks brought together includes symbols or patterns on the clapper sticks that appear complete when the clapper sticks are closed. The audio and video streams are then synchronized (i.e., synchronization process), at block 130, using the two identified times. In one implementation, the synchronization process includes applying optical character recognition (OCR) to frames of the video to read characters from the clapper sticks. When the characters read from the OCR match the known characters on the clapper sticks the system recognizes that the clapper sticks are closed.

Figure 2:
FIG. 2 shows one example of a clapperboard including the symbols or patterns applied on the clapper sticks.

FIG. 2 shows one example of a clapperboard 200 including the symbols or patterns 210 applied on the clapper sticks. The illustrated example of FIG. 2 includes letters and a number (i.e., XXX0) printed or attached to clapper sticks on the clapperboard. The letters are split and aligned so that the upper half of each letter is on the upper stick 220 and the lower half of each letter is on the lower stick 222. The two sticks are connected by a hinge 230 at one end of each stick. When the two sticks 220, 222 are closed or brought together, the letters 210 are complete. In one example, a known word (a "magic word") including multiple letters and/or numbers is printed on a label. The label is cut in half, dividing the letters with half of each letter on the halves of the label. The halves of the labels are attached to the clapper sticks (such as by glue, tape, or adhesive on the label) so that the halves of the letters are aligned so the magic word is readable when the clapper sticks are closed.

In operation, video and audio equipment records video and audio while the clapper sticks are open, while the sticks are closed, and after the sticks are closed. The video sequence includes frames showing the sticks moving together and closing or meeting. The audio sequence includes the sound of the sticks closing (a "clap"). The video and audio are provided to a computer system that includes software for video and audio processing. In the video processing, in one implementation, the computer system uses OCR on the video to determine the time and frame when the letters are readable, indicating when the clapper sticks are closed forming the completed letters. The computer system also uses difference detection on the video to determine the time and frame when the letters are not changing, indicating when the clapper sticks are closed and forming the completed letters. In the audio processing, in one implementation, the computer system uses audio detection on the audio to determine the time when the sound of the clapper occurs. The computer system uses synchronization software which uses the time and frame information determined for the video and audio to synchronize the video and audio. In one example, a dailies software package may perform the synchronization when the times are provided.

In various implementations, different types of markings, patterns or symbols can be used on the clapper sticks. For example, the patterns used on the clapper sticks may be at least one of letters, numbers, symbols, codes, pictures, and other patterns.

In various implementations, the patterns can be applied to the clapper sticks in different ways. For example, the patterns can be printed on the sticks, printed on a material to attach to the sticks (such as tape), engraved in the sticks, or integral to the sticks (such as by molding). In another example, the patterns can be projected onto a surface using visible light or light outside of human sight (such as infrared).

In another example, a projected or displayed pattern changes based on audio detection. The pattern transforms or moves from a first form to a second form when the sound of the clapper sticks closing is detected. The transformation is recorded in the video stream. Detecting the time of the pattern transformation indicates the time of the sound in the video sequence. In another example, the time of the sound is controlled and known, such as using a computer-generated sound.

In another implementation, a sound is caused by detecting a change in an image or lighting. In one example, the sound to mark the pattern time can be created separately from the pattern presentation, such as a sound automatically generated when light is projected onto a surface. Detecting the time of the sound indicates the time of the pattern change in the audio sequence.

One implementation includes one or more programmable processors and corresponding computer system components to store and execute computer instructions, such as to provide the computer system, systems, or system components to process the video and audio, detect the sounds and patterns, and synchronize the video and audio.

Additional variations and implementations are also possible. For example, several implementations have been discussed in the context of movie and film production, but other applications can also be used, such as for game development, motion capture, speeches, presentation, or educational content.

Figure 3:
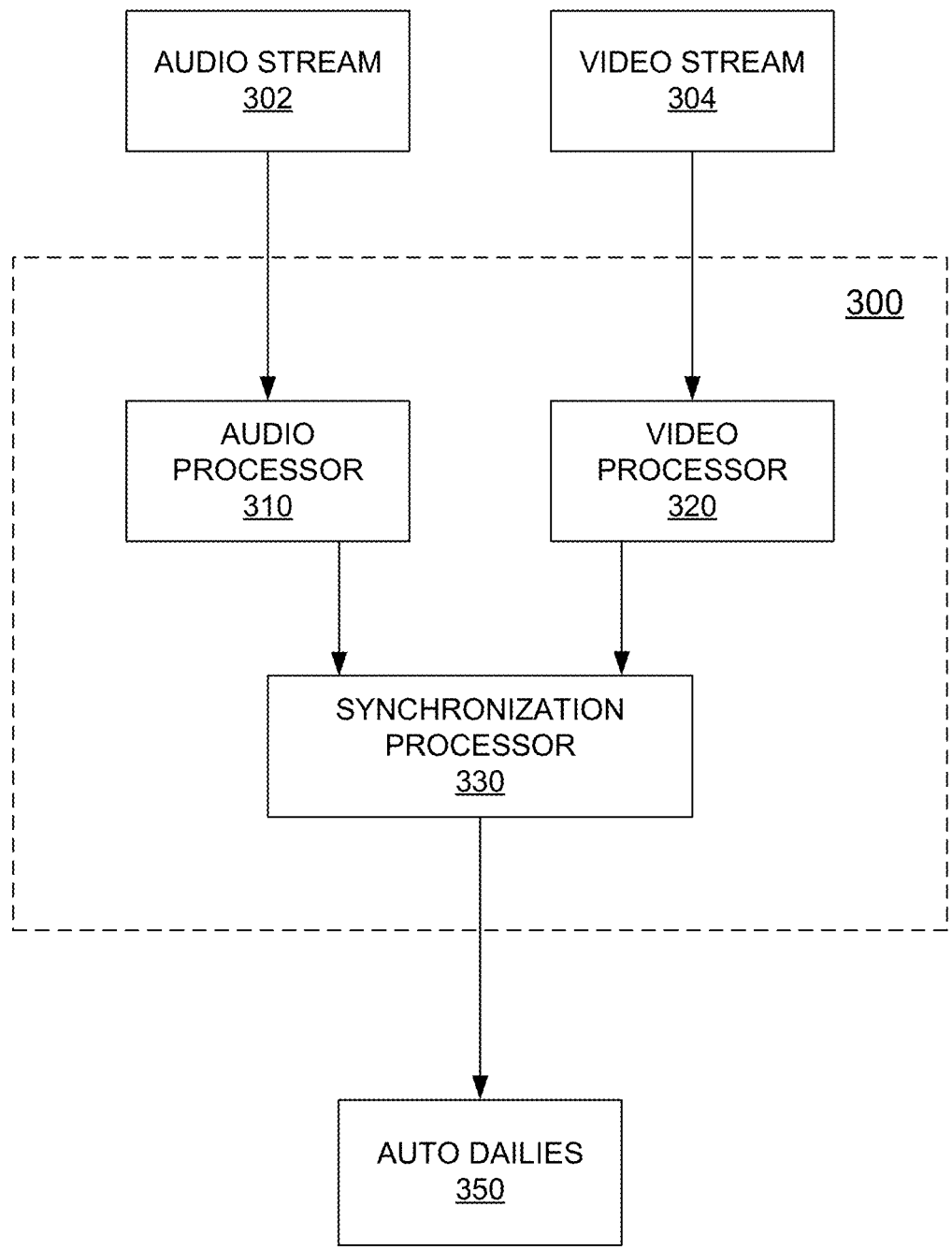
FIG. 3 is a block diagram of a system for synchronizing audio and video content to enable automatic generation of dailies in accordance with one implementation of the present disclosure.

FIG. 3 is a block diagram of a system 300 for synchronizing audio and video content to enable automatic generation of dailies in accordance with one implementation of the present disclosure. In the illustrated implementation of FIG. 3, the system 300 includes an audio processor 310, a video processor 320, and a synchronization processor 330. In one implementation, the blocks 310, 320, and 330 of the system 300 are configured entirely with hardware including one or more digital signal processors (DSPs), general purpose microprocessors, application specific integrated circuits (ASICs), field programmable logic arrays (FPGAs), or other equivalent integrated or discrete logic circuitry.

In one implementation, the audio processor 310 receives and processes the audio stream 302 to identify a time in the audio stream 302 when a sound occurs from bringing two clapper sticks together (i.e., in a closed position). In one implementation, the video processor 320 receives and processes the video stream 304 to identify a time in the video stream 304 when there is an image of the two clapper sticks brought together. The image of the two clapper sticks brought together includes symbols or patterns on the clapper sticks that appear complete when the clapper sticks are together. The computer system uses the two identified times to synchronize the audio and video streams. In one implementation, the video processor 320 applies optical character recognition (OCR) to the frames of the video stream 304 to read characters from the clapper sticks. When the characters read from the OCR match the known characters on the clapper sticks the video processor 320 recognizes that the clapper sticks are together.

In operation, video and audio equipment records video and audio streams while the clapper sticks are open, while the sticks are closed, and after the sticks are closed. The audio stream 302 includes the clap sound of the sticks closing. The video stream 304 includes frames showing the sticks moving together and closing or meeting. The video and audio streams 302, 304 are provided to the system 300 that includes the audio processor 310 and the video processor 320.

In one implementation, the audio processor 310 uses audio detection on the audio stream 302 to determine a time of the clapping sound when the sound of the clapper occurs. In one implementation, the video processor 320 uses OCR on the received video stream 304 to determine clapper closing time and frame when the letters are readable, indicating when the clapper sticks are closed forming the completed letters. The video processor 320 also uses difference detection on the video to determine the clapper closing time and frame when the letters are not changing, indicating when the clapper sticks are closed forming the completed letters.

In one implementation, the synchronization processor 330 uses the time of the clapping sound, the clapper closing time, and the clapper closing frame information determined by the audio and video processors 310, 320 to synchronize the video and audio. In one example, a dailies software package may perform the synchronization when the times and frame are provided. In one implementation, once the video and audio are synchronized, the synchronization processor 330 automatically generates the dailies 350.

Figure 4A:
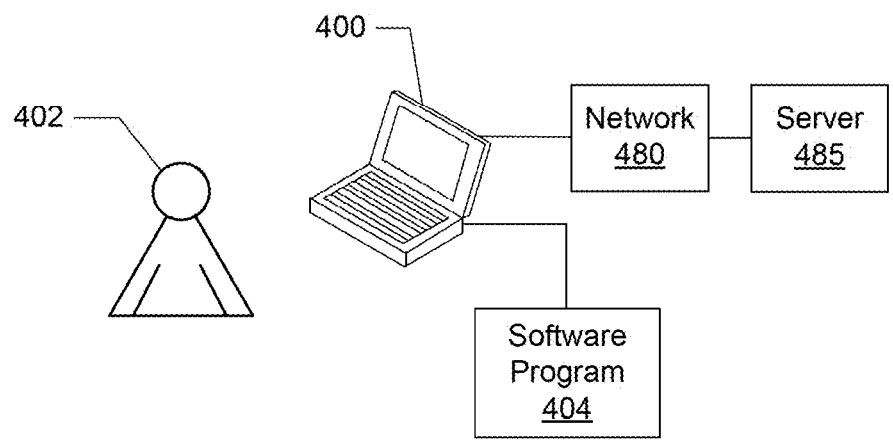
FIG. 4A is a representation of a computer system and a user in accordance with an implementation of the present disclosure.

FIG. 4A is a representation of a computer system 400 and a user 402 in accordance with an implementation of the present disclosure. The user 402 uses the computer system 400 to implement a synchronization application 490 to enable automatic generation of dailies with respect to the process 100 of FIG. 1 and the system 300 of FIG. 3.

Figure 4B:
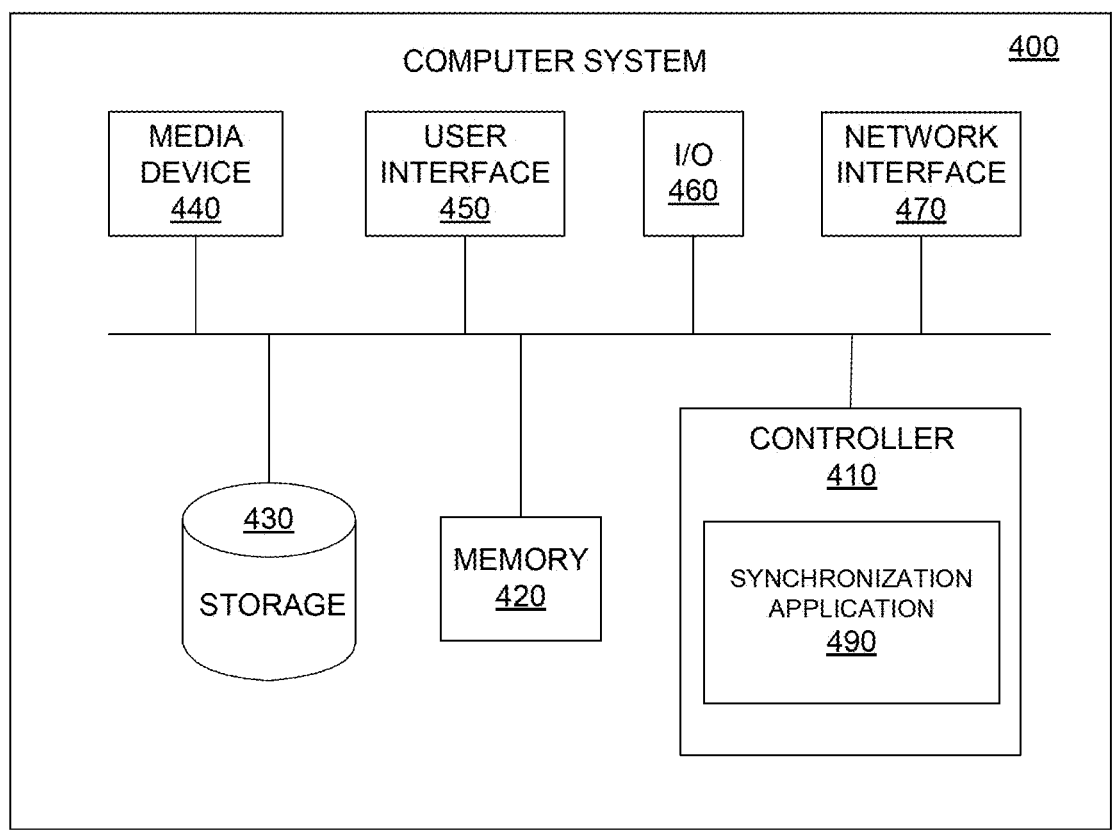
FIG. 4B is a functional block diagram illustrating the computer system hosting the synchronization application in accordance with an implementation of the present disclosure.

The computer system 400 stores and executes the synchronization application 490 of FIG. 4B. In addition, the computer system 400 may be in communication with a software program 404. Software program 404 may include the software code for the synchronization application 490. Software program 404 may be loaded on an external medium such as a CD, DVD, or a storage drive, as will be explained further below.

Furthermore, the computer system 400 may be connected to a network 480. The network 480 can be connected in various different architectures, for example, client-server architecture, a Peer-to-Peer network architecture, or other type of architectures. For example, network 480 can be in communication with a server 485 that coordinates engines and data used within the synchronization application 490. Also, the network can be different types of networks. For example, the network 480 can be the Internet, a Local Area Network or any variations of Local Area Network, a Wide Area Network, a Metropolitan Area Network, an Intranet or Extranet, or a wireless network.

FIG. 4B is a functional block diagram illustrating the computer system 400 hosting the synchronization application 490 in accordance with an implementation of the present disclosure. A controller 410 is a programmable processor and controls the operation of the computer system 400 and its components. The controller 410 loads instructions (e.g., in the form of a computer program) from the memory 420 or an embedded controller memory (not shown) and executes these instructions to control the system, such as to provide the data processing. In its execution, the controller 410 provides the synchronization application 490 with a software system. Alternatively, this service can be implemented as separate hardware components in the controller 410 or the computer system 400.

Memory 420 stores data temporarily for use by the other components of the computer system 400. In one implementation, memory 420 is implemented as RAM. In one implementation, memory 420 also includes long-term or permanent memory, such as flash memory and/or ROM.

Storage 430 stores data either temporarily or for long periods of time for use by the other components of the computer system 400. For example, storage 430 stores data used by the synchronization application 490. In one implementation, storage 430 is a hard disk drive.

The media device 440 receives removable media and reads and/or writes data to the inserted media. In one implementation, for example, the media device 440 is an optical disc drive.

The user interface 450 includes components for accepting user input from the user of the computer system 400 and presenting information to the user 402. In one implementation, the user interface 450 includes a keyboard, a mouse, audio speakers, and a display. In another implementation, the user interface 450 also includes a headset worn by the user and used to collect eye movements as user inputs. The controller 410 uses input from the user 402 to adjust the operation of the computer system 400.

The I/O interface 460 includes one or more I/O ports to connect to corresponding I/O devices, such as external storage or supplemental devices (e.g., a printer or a PDA). In one implementation, the ports of the I/O interface 460 include ports such as: USB ports, PCMCIA ports, serial ports, and/or parallel ports. In another implementation, the I/O interface 460 includes a wireless interface for communication with external devices wirelessly.

The network interface 470 includes a wired and/or wireless network connection, such as an RJ-45 or "Wi-Fi" interface (including, but not limited to 802.11) supporting an Ethernet connection.

The computer system 400 includes additional hardware and software typical of computer systems (e.g., power, cooling, operating system), though these components are not specifically shown in FIG. 4B for simplicity. In other implementations, different configurations of the computer system can be used (e.g., different bus or storage configurations or a multi-processor configuration).

In one particular implementation, a method for synchronizing audio and video streams to enable automatic generation of dailies is disclosed. The method includes: identifying a first time in the audio stream when a sound occurs from closing clapper sticks; identifying a second time in the video stream when there is an image of the clapper sticks closed, wherein the clapper sticks include symbols or patterns applied on a surface of the clapper sticks which appear complete when the clapper sticks are closed; and synchronizing the audio and video streams using the first and the second time.

In one implementation, the method further includes automatically generating the dailies once the audio and video streams are synchronized. In one implementation, synchronizing the audio and video streams includes applying optical character recognition (OCR) to frames of the video stream to read the symbols or patterns, wherein when the read symbols or patterns match known characters on the clapper sticks, it is determined that the clapper sticks are closed. In one implementation, the symbols or patterns applied on a surface of the clapper sticks include at least one of letters, numbers, symbols, codes, pictures, and other similar patterns printed or attached to the clapper sticks. In one implementation, the symbols or patterns are split and aligned so that an upper half of the symbols or patterns is on an upper part of the clapper stick and a lower half of the symbols or patterns is on a lower part of the clapper stick. In one implementation, the upper half and the lower half of the symbols or patterns are attached to the clapper sticks by glue, tape, or adhesive so that the symbols or patterns are aligned and readable when the clapper sticks are closed. In one implementation, identifying a second time in the video stream includes applying a difference detection on frames of the video stream to determine the second time and a corresponding frame when the symbols or patterns are not changing, indicating that the clapper sticks are closed. In one implementation, applying the symbols or patterns on the surface of the clapper sticks includes one of printing the symbols or patterns on the clapper sticks, printing the symbols or patterns on a material to attach to the clapper sticks, engraving the symbols or patterns directly on the clapper sticks, or forming the symbols or patterns as an integral part of the clapper sticks. In one implementation, applying the symbols or patterns on the surface of the clapper sticks includes projecting or displaying the symbols or patterns onto the surface using at least one of visible light and IR light. In one implementation, the projected or displayed symbols or patterns change based on audio detection. In one implementation, the symbols or patterns change by transforming from a first form to a second form when the sound from the clapper sticks closing is detected. In one implementation, the dailies are automatically generated for one of movie production, game development, motion capture, speeches, presentation, or educational content.

In another particular implementation, a system for synchronizing audio and video streams to enable automatic generation of dailies is disclosed. The system includes: an audio processor to receive and process the audio stream to identify a first time in the audio stream when a sound occurs from bringing clapper sticks together; a video processor to receive and process the video stream to identify a second time in the video stream when there is an image of the clapper sticks brought together, wherein the clapper sticks include symbols or patterns applied on a surface of the clapper sticks which appear complete when the clapper sticks are brought together; and a synchronization processor to synchronize the audio and video streams using the first and the second time.

In one implementation, the synchronization processor automatically generates the dailies once the audio and video streams are synchronized. In one implementation, the synchronization processor applies OCR to frames of the video stream to read the symbols or patterns, wherein when the read symbols or patterns match known characters on the clapper sticks, it is determined that the clapper sticks are closed. In one implementation, the video processor applies a difference detection on frames of the video stream to determine the second time and a corresponding frame when the symbols or patterns are not changing, indicating that the clapper sticks are brought together.

In yet another particular implementation, a non-transitory computer-readable storage medium storing a computer program to synchronize audio and video streams to enable automatic generation of dailies includes executable instructions that cause a computer to: identify a first time in the audio stream when a sound occurs from closing clapper sticks; identify a second time in the video stream when there is an image of the clapper sticks closed, wherein the clapper sticks include symbols or patterns applied on a surface of the clapper sticks which appear complete when the clapper sticks are closed; and synchronize the audio and video streams using the first and the second time.

In one implementation, the non-transitory computer-readable storage medium further includes executable instructions that cause the computer to automatically generate the dailies once the audio and video streams are synchronized. In one implementation, executable instructions that cause the computer to synchronize the audio and video streams include executable instructions that cause the computer to apply OCR to frames of the video stream to read the symbols or patterns, wherein when the read symbols or patterns match known characters on the clapper sticks, it is determined that the clapper sticks are closed. In one implementation, executable instructions that cause the computer to identify the second time in the video stream include executable instructions that cause the computer to apply a difference detection on frames of the video stream to determine the second time and a corresponding frame when the symbols or patterns are not changing, indicating that the clapper sticks are closed.

The description herein of the disclosed implementations is provided to enable any person skilled in the art to make or use the present disclosure. Numerous modifications to these implementations would be readily apparent to those skilled in the art, and the principles defined herein can be applied to other implementations without departing from the spirit or scope of the present disclosure. Thus, the present disclosure is not intended to be limited to the implementations shown herein but is to be accorded the widest scope consistent with the principal and novel features disclosed herein. Accordingly, additional variations and implementations are also possible.

All features of each of the above-discussed examples are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A method for synchronizing audio and video streams to enable automatic generation of synchronized dailies, the method comprising:
   identifying a first time in the audio stream when a sound occurs from closing clapper sticks;
   identifying a second time in the video stream when there is an image of the clapper sticks closed,
   wherein the clapper sticks include symbols or patterns applied on each surface of the clapper sticks which appear complete when the clapper sticks are closed,
   wherein identifying the second time in the video stream includes identifying the completed symbols and patterns; and
   synchronizing the audio and video streams using the first and the second time.

2. The method of claim 1, further comprising
   automatically generating the synchronized dailies once the audio and video streams are synchronized.

3. The method of claim 1, wherein synchronizing the audio and video streams includes
   applying optical character recognition (OCR) to frames of the video stream to read the symbols or patterns,
   wherein when the read symbols or patterns match known characters on the clapper sticks, it is determined that the clapper sticks are closed.

4. The method of claim 1, wherein the symbols or patterns applied on a surface of the clapper sticks include
   at least one of letters, numbers, symbols, codes, pictures, and other similar patterns printed or attached to the clapper sticks.

5. The method of claim 1, wherein the symbols or patterns are split and aligned so that an upper half of the symbols or patterns is on an upper part of the clapper stick and a lower half of the symbols or patterns is on a lower part of the clapper stick.

6. The method of claim 5, wherein the upper half and the lower half of the symbols or patterns are attached to the clapper sticks by glue, tape, or adhesive so that the symbols or patterns are aligned and readable when the clapper sticks are closed.

7. The method of claim 1, wherein applying the symbols or patterns on the surface of the clapper sticks includes
   one of printing the symbols or patterns on the clapper sticks, printing the symbols or patterns on a material to attach to the clapper sticks, engraving the symbols or patterns directly on the clapper sticks, or forming the symbols or patterns as an integral part of the clapper sticks.

8. The method of claim 1, wherein applying the symbols or patterns on the surface of the clapper sticks includes
   projecting or displaying the symbols or patterns onto the surface using at least one of visible light and IR light.

9. The method of claim 8, wherein the projected or displayed symbols or patterns change based on audio detection.

10. The method of claim 9, wherein the symbols or patterns change by transforming from a first form to a second form when the sound from the clapper sticks closing is detected.

11. The method of claim 1, wherein the synchronized dailies are automatically generated for one of movie production, game development, motion capture, speeches, presentation, or educational content.

12. A system for synchronizing audio and video streams to enable automatic generation of synchronized dailies, the system comprising:
    an audio processor to receive and process the audio stream to identify a first time in the audio stream when a sound occurs from bringing clapper sticks together;
    a video processor to receive and process the video stream to identify a second time in the video stream when there is an image of the clapper sticks brought together,
    wherein the clapper sticks include symbols or patterns applied on each surface of the clapper sticks which appear complete when the clapper sticks are brought together,
    wherein the second time is identified in the video stream by identifying the completed symbols and patterns; and
    a synchronization processor to synchronize the audio and video streams using the first and the second time.

13. The system of claim 12, wherein the synchronization processor automatically generates the synchronized dailies once the audio and video streams are synchronized.

14. The system of claim 12, wherein the synchronization processor applies OCR to frames of the video stream to read the symbols or patterns,
    wherein when the read symbols or patterns match known characters on the clapper sticks, it is determined that the clapper sticks are closed.

15. A non-transitory computer-readable storage medium storing a computer program to synchronize audio and video streams to enable automatic generation of synchronized dailies, the computer program comprising executable instructions that cause a computer to:
    identify a first time in the audio stream when a sound occurs from closing clapper sticks;
    identify a second time in the video stream when there is an image of the clapper sticks closed,
    wherein the clapper sticks include symbols or patterns applied on a surface of the clapper sticks which appear complete when the clapper sticks are closed,
    wherein identifying the second time in the video stream includes identifying the completed symbols and patterns; and
    synchronize the audio and video streams using the first and the second time.

16. The non-transitory computer-readable storage medium of claim 15, further comprising executable instructions that cause the computer to automatically generate the synchronized dailies once the audio and video streams are synchronized.

17. The non-transitory computer-readable storage medium of claim 15, wherein executable instructions that cause the computer to synchronize the audio and video streams include executable instructions that cause the computer to
- apply OCR to frames of the video stream to read the symbols or patterns,
- wherein when the read symbols or patterns match known characters on the clapper sticks, it is determined that the clapper sticks are closed.

* * * * *